Feb. 12, 1935.                G. DOHERTY                1,990,640
ELECTRIC HEATER
Original Filed Aug. 12, 1931
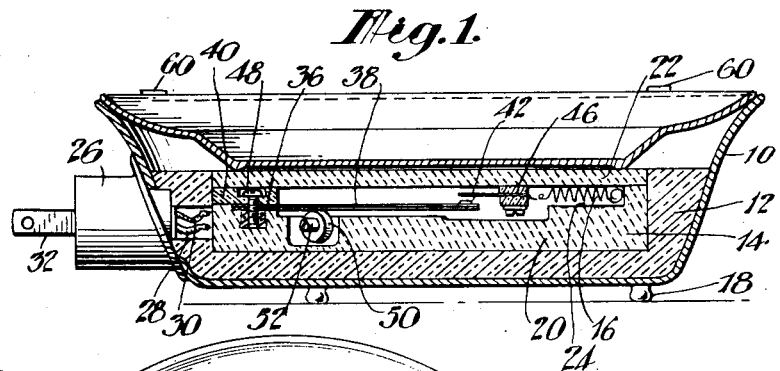
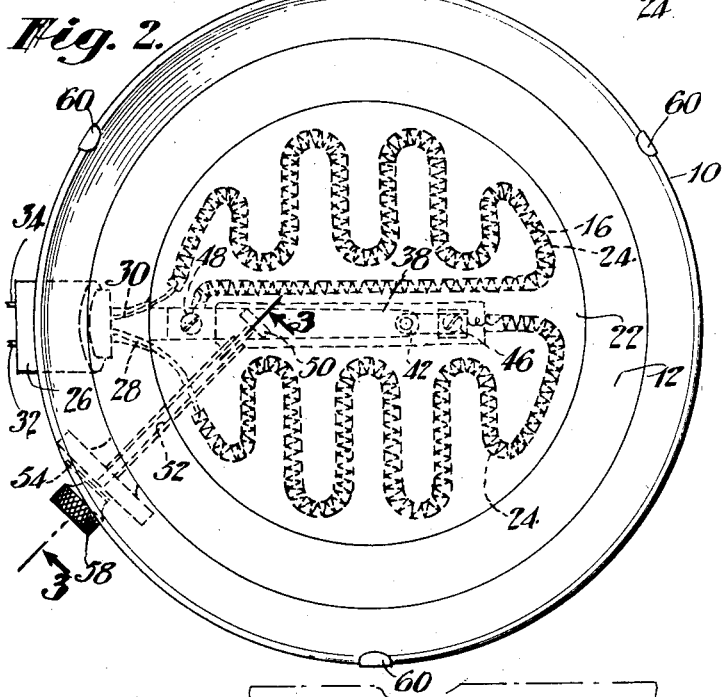
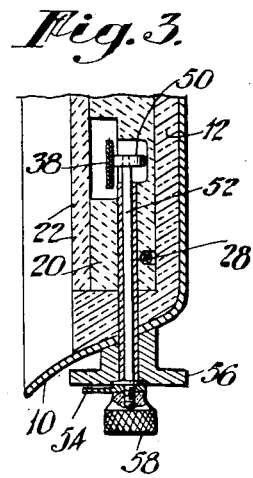
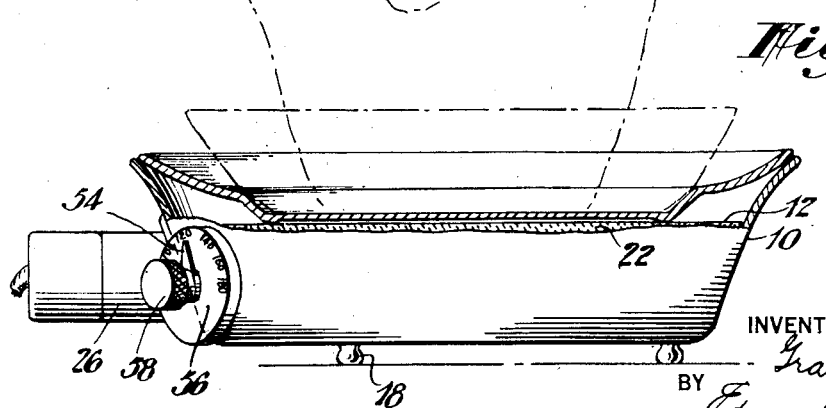
INVENTOR
Grace Doherty
BY Edmund G. Borden
ATTORNEY Patented Feb. 12, 1935

1,990,640

UNITED STATES PATENT OFFICE 1,990,640

ELECTRIC HEATER

Grace Doherty, New York, N. Y.

Application August 12, 1931, Serial No. 556,473
Renewed September 14, 1933

6 Claims. (Cl. 219—43)

This invention relates to electric heaters and more particularly to dish warmers which are adapted for individual warming service at a dining table, or for service in sanitariums, hospitals and the like.

It is very desirable that some food should be eaten while warm or hot. The ordinary dishes used are not adapted for keeping food warm or hot. The present invention lends itself readily to the heating of dishes whereby the dish and any food therein may be kept at any desired temperature for any period of time while being adapted for individual service.

One object of the invention is to provide a warmer that may be used with any form of highly polished furniture without injuring the varnish, lacquer or other type of polished surface.

Another object of the invention is to provide an individual dish warmer that can be readily adjusted to maintain any desired temperature of the material to be heated.

A further object of the invention is to provide a dish warmer which is adaptable for securing different shaped dishes to be heated securely in position.

With this and other objects and features in view the invention consists in the improved dish warmer hereinafter described and particularly defined in the claims.

The various features of the invention are illustrated in the accompanying drawing, in which:

Fig. 1 is a vertical sectional view of the improved dish warmer embodying a preferred form of the invention;

Fig. 2 is a top plan view of the improved dish warmer;

Fig. 3 is a vertical sectional view taken on the line 3—3 of Fig. 2 showing details of a thermostat adjusting device embodied in the electrical circuit of the resistance heating element of the improved dish warmer; and Fig. 4 is a view in elevation with parts broken away showing the improved dish warmer and the method by which dishes of different shapes may be securely held in heating position.

The dish warmer shown in the drawing comprises an outer metallic container 10 having a heat resisting and heat insulating lining 12 mounted within the lower portion of the container and a refractory highly heated conducting electrically insulating body 14 mounted within the heat insulating lining 12, and having an electric resistance heating element 16 embedded therein. Container 10 is preferably made of metal which will take a high polish and is provided with legs 18. It is not essential that this container be made of metal because it could be made of pottery or other forms of plastic wares.

One important feature of the invention is the provision of a heat insulating lining 12 within the container 10 by which the heating of a dish or other receptacle will not act to heat the container 10 or legs on the container that come into contact with a table and thereby avoid injury to the varnish, lacquer or other forms of polished surfaces. The heat insulating lining 12 is preferably made up of a material such as powdered asbestos, 85% magnesia, diatomaceous earth and may have some dense refractory material such as zircon embedded therein. A satisfactory heat insulating lining comprises a light porous asbestos bonded with phosphoric acid. When making the lining a small amount of zinc dust or aluminum dust is placed in the material at the time the acid is mixed with asbestos so that during the heating of the lining to dry and calcine it, gas will be formed which will make the lining very porous and light and give it a very effective heat insulating property. Diatomaceous earth and magnesia may be bonded into a liner in the same way or a mixture of two or more of these materials can be bonded with phosphoric acid to form a satisfactory lining. The lining is usually molded in place in the container 10 and fired and finished while in the container.

The electrical insulating and high heat conducting body 14 in which is mounted the resistance heating element 16 is preferably made up as a special unit and secured in a cavity in the lining 12 which is specially made and adapted to receive it. The insulating body has a special construction which particularly adapts it for heating purposes. The special features of importance of the insulating body are that it is a highly refractory body which will stand a high degree of heat without excess expansion and will not crack or disintegrate when being rapidly heated or rapidly cooled, or being repeatedly changed from a hot to a cooled condition. Another important feature of this refractory body is that it is a very good heat conductor, in that it will conduct heat as well as most metals such as steel, or better than these products. Furthermore this heat conducting refractory while in a heated condition also acts as an electrical insulator, and permits the heating element to be embedded or mounted directly in the refractory material so that the refractory material having the high heat conductivity can receive its heat directly by conduction and convection as well as by radiation. This feature is very important in that it gives a very efficient heat transfer from the resistance heating element to the body to be heated.

The heat resistant electrical insulating body is preferably made up of 75 parts of ferro-silicon, the ferro-silicon (containing substantially 85% silicon) 10 parts carborundum or silicon carbide, 10 parts zircon, these refractory materials being bonded by 6% of their weight of orthophosphoric acid. The refractory materials are preferably mixed together with the phosphoric acid, molded into the desired form under a pressure of from 500 to 1000 pounds, and then fired to a temperature of from 2000° to 3000° F.

As shown in Fig. 1 the body 14 is formed in two parts, a lower section 20 being arranged to receive the heating element and a cover plate 22 being arranged to cover the resistance heating element and to form the contact piece upon which the receptacles to be heated are directly placed. The cover plate 22 is formed of the same material as the body 20 with the exception that the upper surface of the cover is preferably provided with a glaze which will fill the pores of the cover and prevent liquids or other materials from seeping through the cover to come in contact with the resistance element, and thus avoid short circuiting of the resistance element. A groove 24 is formed in the upper surface of the body 20 which has a size just sufficient to tightly receive the coiled resistance heating element 16. When the resistance heating element is in place in the groove 24 the cover 22 will touch the upper side of the heating coil 16. In many cases it is sufficient to make only the cover plate 22 of the refractory ferro-silicon, carborundum and zircon materials. For lower temperature work the lower section 20 may be made of a material similar to the heat insulating lining 12. If the lower section is made of a porous refractory material it is desirable to embody considerable zircon into the porous composition in order to give it more strength and density.

The electrical circuit for the resistance heating element comprises the usual cord socket having wires connected in series with the ends of the resistance heating element 16 and a thermostat switch mounted in the series in the circuit of the resistance heating element. The socket 26, Figs. 1 and 2, is the usual form of insulated socket and is secured to the side of the receptacle 10 in a position for making a convenient connection with the ends of the resistance heating element in the refractory body 14. A terminal wire 28 connects with one end of the resistance element 10 and a terminal wire 30 connects with the other end of the resistance heating element. These terminal wires have terminals 32 and 34 respectively adapted to be connected with the usual lighting circuit. A thermostatic switch 36 is mounted in a special cavity formed in the body 20 of the resistance heating element. This thermostat consists of a bi-metallic thermostatic element 38, Fig. 1, supported by an insulating member 40 and having a free end 42 adjacent a terminal 44 mounted in a metallic supporting member 46. The fixed end of the bi-metallic element 38 is connected at 48, Fig. 2, with a portion of the resistance heating element 16 and the terminal 46 is connected with another portion of the resistance heating element 16. The thermostatic switch is so constructed that the point 42 will make contact with the terminal 44 when the heating element or resistance body is cold, but when the temperature of the refractory heat conducting body has been raised to a predetermined degree the point 42 will be discontinued from the terminal 44 and thus open the heating circuit through the heat resistance element.

It is desirable with a warmer of the type of the present invention to vary the temperature of the heating. Accordingly, provision has been made for changing the temperatures at which the thermostatic switch will open the heating circuit. To accomplish this an eccentric cam 50 made of a temperature resisting and electrical non-conducting material is mounted directly under the bi-metallic member 38 of the thermostat 36 and is arranged to be adjusted to raise and lower the member 38 in order to vary the action of the bi-metallic member in making and breaking the electrical heating circuit. The cam 50 is mounted on a rod 52, Figs. 1, 2 and 3, the rod extending through the bodies 14 and 12 to the outside of the container 10. On the outer end of the rod 52 is mounted a pointer 54, Figs. 3 and 4, which moves over a dial face 56 that is secured to the outside of the container 10. A knurled head 58 formed of the electrical insulating material is secured to the outer end of the rod 52 by which the rod may be rotated to change the setting of the eccentric cam 50 and the pointer 54. Graduations on the dial 56 indicate substantially the temperature of the heating element for various settings of the eccentric cam.

The construction and arrangement of the container 10 and the heating body 14 are such that when an ordinary porcelain plate rests on top of the cover plate 22 the outer edge of the plate will rest against the upper edge of the container. A series of spring clips 60 are mounted around the edge of the container 10, by which the porcelain plate is securely held in position as shown in Fig. 1.

Different kinds of food require different kinds of dishes. Accordingly, the present invention contemplates the use of different shaped dishes, all of which dishes have a base of the same shape or form wherein the base will rest on top of of the plate 22 and against the upper edge of the container 10 to be securely locked in position. A cup or soup bowl of any desired shape can be secured to the base of the dish so that when the base is locked in position the cup or other type of dish will be held securely in position.

It will be apparent that the present warmer can be used at a table, and if many warmers are used at the same table it is merely necessary to have a sufficient number of electric wire cords to connect with each warmer for individual heating service. This individual service warmer can be used in hospitals for service at beds, or in any desired position by merely providing a cord for connection with the usual electrical circuit.

Having thus described the invention what is claimed as new is:

1. In an electric heater, in combination, a container having a heat insulating lining, a refractory body having heat conducting properties equal to steel and also having high electrical insulating properties mounted within the lining and having its upper surface exposed, an electrical resistance element mounted within the refractory body and means for controlling an electric current flow through said resistance element.

2. The combination of claim 1 wherein a thermostatic switch is mounted within the refractory body in the circuit of the resistance element.

3. The combination of claim 1 wherein a thermostatic switch having a visible dial attachment for providing different temperatures is mounted within the refractory body in the circuit of the resistance element.

4. The combination of claim 1 wherein the resistance element is embedded in the refractory heat conducting element.

5. The combination of claim 1 wherein clips arranged to engage the edge of a dish or receptacle are mounted on the container to securely hold dishes or other receptacles in position on the container.

6. In an electrical heater in combination a container, an electrical insulating porous lining within the container, a refractory body having a high heat conducting property substantially equalling that of steel and a high electrical insulating property mounted within the container and said lining, an electrical resistance element permanently embedded within said refractory body and means for controlling the flow of electrical current through said resistance element.

GRACE DOHERTY.